D. WARREN
Seed Planter.
No. 28,926.
Patented June 26, 1860.
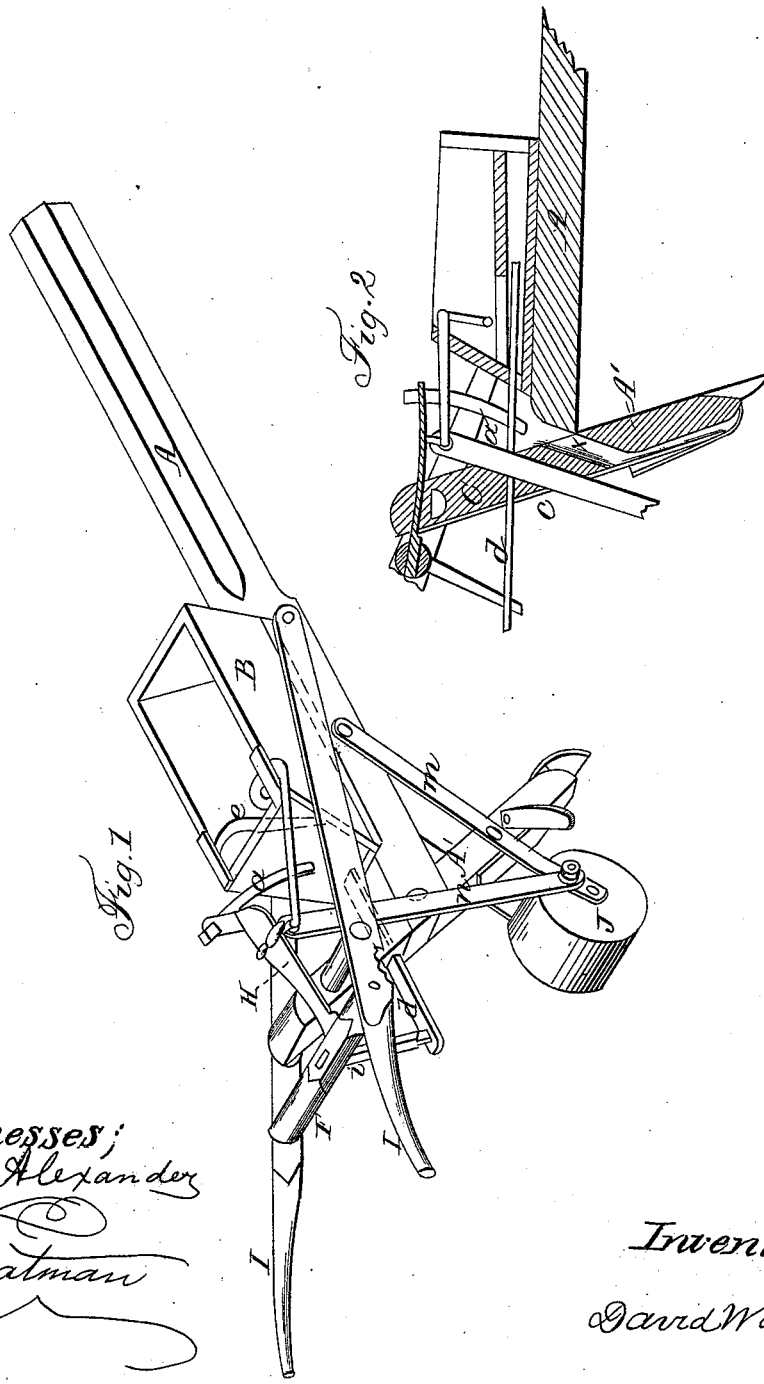
Witnesses;
C. M. Alexander
A. H. Featman
Inventor;
David Warren

UNITED STATES PATENT OFFICE.

DAVID WARREN, OF GETTYSBURG, PENNSYLVANIA.

IMPROVEMENT IN SEED-PLANTERS.

Specification forming part of Letters Patent No. 28,926, dated June 26, 1860.

*To all whom it may concern:*

Be it known that I, DAVID WARREN, of Gettysburg, in the county of Adams and State of Pennsylvania, have invented certain new and useful Improvements in Seed-Planters; and I do hereby declare that the following is a full, clear, and exact description of the same, reference being had to the accompanying drawings, and to the letters of reference marked thereon.

The nature of my invention consists in constructing and arranging the several parts of the planter substantially in the manner hereinafter described.

In the annexed drawings, Figure 1 represents a perspective of the machine. Fig. 2 is a section of a portion of the machine.

In the figures, A represents the plow-beam, and A' the standard at the rear of said beam, to which the plow-blades are attached, the beam, the standard, and the blades being constructed and arranged as is usual with the ordinary shovel-plow.

B represents a seed-hopper, which is placed upon the beam A near its rear and between the handles I I.

F represents a bar, which is placed between the handles, connecting them like the usual round, but so arranged that it can turn when desired.

To the bar F is secured an arm, H, and to the arm H is secured an arm, *a*. When the bar F partially revolves backward and forward the arm *a* rises and falls. As said arm falls it passes through an opening in the seed-slide, which contains the seed, as seen in Fig. 2. The seed-slide *d* is connected to the bar F by means of a rod, *i*. Said slide *d* is made to pass into the seed-hopper, and its aperture filling with seed, it is drawn back or out from the hopper. Just after being drawn out the arm *a* descends and, passing through the aperture, drives the seed out, and they fall to the ground.

J represents a roller, which is stationed behind the plow by means of bars *m m*, which are secured to the beam and to the standard, as shown.

*n* is a small pitman, which is attached at one end to a crank on a shaft which passes through the roller. The other end of said pitman is attached to the arm H. When the roller turns the pitman moves the arm H up and down at its outer end.

*e* represents a bent rod, which is attached at one end to the pitman. A portion of this rod hangs in the hopper and serves as a stirrer.

*c* is a small rod connected to the arm H, which serves as a stirrer in the seed-spout at the back of the standard. An opening, *x*, is made through the rear of the beam and through the standard, in order that the seed may fall through them after passing from the seed-slide. The seed-slide passes through the standard A, as is clearly seen in Fig. 1.

Coverers may be attached to the standard, which will cover the grain as the plow is in progress.

In using this machine no more trouble attends it than attends the ordinary plow. The forward motion of the machine revolves the roller J, which in turn imparts motion, by means of the pitman *n*, to the arms H and *a*, to the seed-slide *d*, and to the stirrers *c* and *e*, without any effort or care on the part of the operator, who simply walks behind and holds the handles of the plow in proper position. There can be no danger of the seeds clogging the aperture in the slide, as it will be opened at every motion of the arm *a*, which falls every time the seed-slide is drawn out.

Having thus fully described my invention, what I claim as new, and desire to secure by Letters Patent, is—

The arrangement of the turning-bar F, the arms H and *a*, the slide *d*, rod *c*, and stirrer *e*, substantially in the manner and for the purpose herein fully set forth.

D. WARREN.

Witnesses:
GEO. A. MOLD,
JOHN MILLER.